(12) United States Patent
Gonzaga et al.

(10) Patent No.: US 8,752,605 B2
(45) Date of Patent: Jun. 17, 2014

(54) DEVICE FOR THE AUTOMATIC DEMOUNTING OF A TIRE FROM A RIM AND MACHINE EQUIPPED WITH SUCH DEVICE

(75) Inventors: Tullio Gonzaga, Correggio (IT); Silvano Santi, Imola (IT)

(73) Assignee: Butler Engineering & Marketing S.p.A. (IT)

( * ) Notice: Subject to any disclaimer, the term of this patent is extended or adjusted under 35 U.S.C. 154(b) by 245 days.

(21) Appl. No.: 13/474,145

(22) Filed: May 17, 2012

(65) Prior Publication Data

US 2012/0291959 A1 Nov. 22, 2012

(30) Foreign Application Priority Data

May 20, 2011 (IT) .............................. VR2011A0112

(51) Int. Cl.
*B60C 25/138* (2006.01)
*B60C 25/04* (2006.01)
*B60C 25/05* (2006.01)

(52) U.S. Cl.
CPC .............. *B60C 25/138* (2013.01); *B60C 25/04* (2013.01); *B60C 25/0506* (2013.04)
USPC ....................................................... 157/1.3

(58) Field of Classification Search
CPC .... B60C 25/04; B60C 25/05; B60C 25/0506; B60C 25/0527; B60C 25/0563; B60C 25/0575; B60C 25/132; B60C 25/138

USPC ................................. 157/1.3, 1.47, 1.48, 1.49
See application file for complete search history.

(56) References Cited

U.S. PATENT DOCUMENTS 3,267,983 A * 8/1966 Furrer .......................... 157/1.24
2012/0298313 A1 * 11/2012 Barbetti et al. ............... 157/1.17

FOREIGN PATENT DOCUMENTS

EP         1 593 533      11/2005
WO    WO 2009/138322 A1  11/2009

OTHER PUBLICATIONS

Search Report dated Dec. 28, 2011 issued in corresponding Italian patent application No. VR2011A000112.

* cited by examiner

*Primary Examiner* — David B Thomas
(74) *Attorney, Agent, or Firm* — Ostrolenk Faber LLP

(57) ABSTRACT

A device for automatic demounting of a tire from a rim having: a support arm (4); a demounting tool (10) articulated to the support arm (4); an attachment member (12) having one end articulated to the demounting tool (10) by a first articulation pin (13) and the other end thereof pivoted to the support arm (4) around a second articulation pin (14) extending substantially parallel to the first articulation pin (13); at least one extension appendage of the support arm (4) or a section (17) of the support arm (4), which extends beyond the second articulation pin (14); and at least one tie rod member (18) that is articulated on one side to the tool, and on the other side to the extension appendage or section (17) of the support arm (4).

13 Claims, 5 Drawing Sheets

DEVICE FOR THE AUTOMATIC DEMOUNTING OF A TIRE FROM A RIM AND MACHINE EQUIPPED WITH SUCH DEVICE

FIELD OF INVENTION

The present invention regards a device for the automatic demounting of a tire from a rim and a machine equipped with such device.

BACKGROUND OF INVENTION

Numerous devices for demounting a tire from a rim have already been proposed, such devices being installed on a tire mounting-demounting machine. More particularly, they are supported at the projecting end of a telescopic support arm slidably mounted in any suitable manner on guides, which, in the case of a vertical tire mounting-demounting machine, are borne by or are integral with an upright or column which upwardly extends on the rear of the base of the tire mounting-demounting machine.

The support arm is equipped with means for controlling both the lifting-lowering thereof and in order to carry out controlled movements of extension-withdrawal with respect to the upright or column. Below the telescopic support arm, the tire mounting-demounting machine supports, on its own base, rotatable rim-carrier means, such as a table equipped with retention jaws or a group of expandable-retractable arms or the like, for engaging a rim or a tired wheel and driving it in controlled rotation.

The patent IT-1 381 936 in the name of the Applicant of the present patent application teaches a work tool articulated to the projecting end of a telescopic support arm, as specified above, by means of an extension element which is connected to the work tool with the interposition of articulation means adapted to allow the articulation between the extension and the tool in accordance with a thrust force applied to the tool. The articulation means comprise an articulation pin between the extension element and the tool, an elbow-shaped lever pivoted in an intermediate point thereof on the articulation pin and having one end thereof pivoted to the tool and the other end thereof pivoted to one end of a gas spring, whose other end is articulated to an intermediate point of the support arm. The function of the gas spring is that of yieldably opposing the articulation between the tool and the extension element, so as to prevent the tool from being tilted and thus not working the moment it is brought into contact with the flank or bead of a tire to be demounted.

A tool structured like that taught in the patent IT-1 381 936 operates in a very satisfactory manner with most of the tires on the market, but it does not work as well with tires equipped with bead-saver edge. Indeed, due to the relative rigidity of the articulation between the tool and the extension ensured by the presence of the gas spring, the tool—when it is brought against a bead of a tire equipped with bead-saver edge, which is an edge in relief that in use comes to be situated in abutment against the edge of the rim—upon receiving the lowering thrust of the support arm, slides backwards on the bead-saver edge, i.e. instead of inserting its own tip between the bead and the rim, it is moved away from the rim. After this, the tip is prevented from reaching the zone between bead and rim, due to the presence of the bead-saver edge which it is no longer able to pass over. This blocks the continuation of the automatic demounting operation, and requires the manual intervention of the operator on the tool, with consequent downtime in the tire maintenance operation.

Similar problems can also be encountered with other tire types: during the demounting steps, the tool can be stuck on the side of the tire and thus it will not be able to correctly complete the demounting operations. With soft tires in particular, the demounting tool might be driven into the side of the tire during demounting, so that the tool is stuck on the side of the tire, in which case it will be necessary to return the tool to a position distant from the tire and restart the demounting cycle.

EP-1 593 533 and WO/2009-138 322 teach respective machines for demounting a tire from a wheel rim.

SUMMARY OF THE INVENTION

A main object of the present invention is to provide a device for the automatic demounting of a tire from a rim suitable for eliminating the drawbacks connected with the use of a tire demounting tool of the above-described type.

Another object of the present invention is to provide an automatic demounting device of multipurpose use with any tire type—with or without bead-saver edge.

Another object of the present invention is to provide an automatic demounting device with reliable functioning and competitive manufacturing cost.

Another object of the present invention is to provide a tire mounting-demounting machine suitable for correctly carrying out the operations of demounting of a tire from a rim.

These and other objects which will become clearer below are attained by a device for the automatic demounting of a tire from a rim having:
- a support arm designed to be mounted on a tire mounting-demounting machine equipped with rotatable rim-carrier means for engaging a rim or a tired wheel and driving it in controlled rotation around a rotation axis, the support arm being liftable and lowerable in a direction substantially parallel to the rotation axis,
- a demounting tool articulated to the support arm and designed to be positioned, in use, on top of or in front of rotatable rim-carrier means,
- an attachment member for the demounting tool, which has one end thereof articulated to the demounting tool by means of a first articulation pin and the other end thereof pivoted to the support arm around a second articulation pin extending substantially parallel to the first articulation pin, the device also comprising:
- at least extension appendage of the support arm or a section of the support arm, which extends beyond the second articulation pin, and
- at least one tie rod member articulated on one side to the tool and on the other side to the extension appendage or section of the support arm.

Advantageously, the device comprises means for controlling the articulation between the demounting tool and the attachment member, including an articulation lever system between the tool and the tie rod member.

BRIEF DESCRIPTION OF THE DRAWINGS

Further aspects and advantages of the present invention will become clearer from the following detailed description of specific embodiments of a demounting machine, such description being made with reference to the accompanying drawings, in which.

In the drawings, equivalent or similar parts or components were marked with the same reference numerals.

DETAILED DESCRIPTION OF THE PREFERRED EMBODIMENTS

Figure 1:
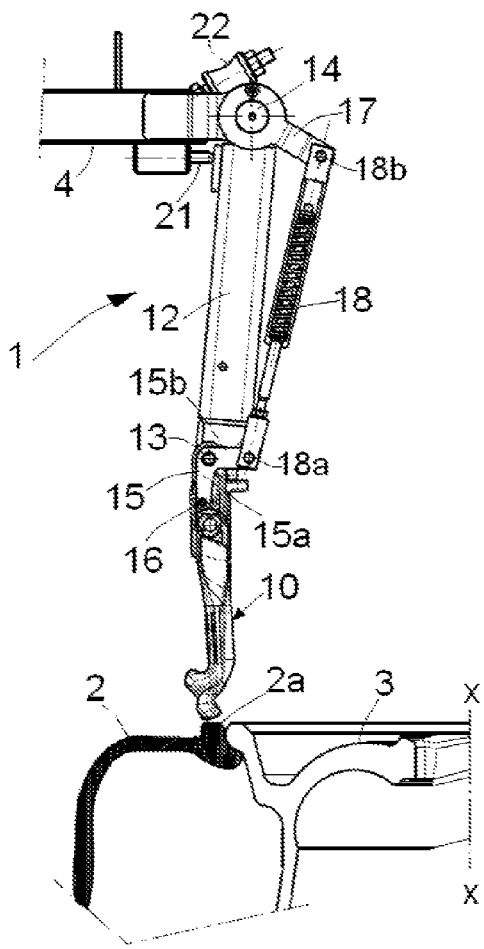
FIG. 1 is a side elevation view of an automatic demounting device illustrated while moving closer to the bead of a tire to be demounted that is equipped with a bead-saver edge and shown sectioned together with a sectioned part of the respective rim.
Figure 2:
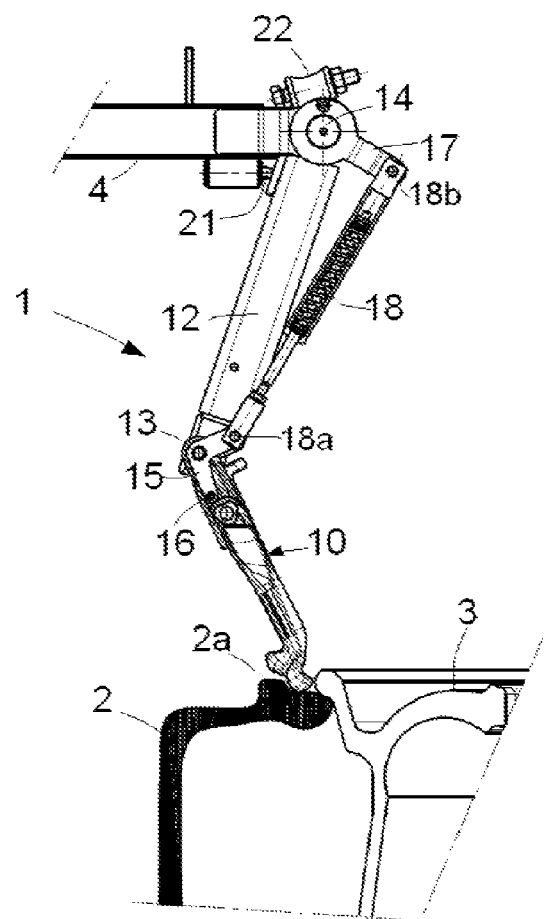
FIG. 2 illustrates the device of FIG. 1 in position for starting the penetration between the bead-saver edge and the edge of the rim.
Figure 3:
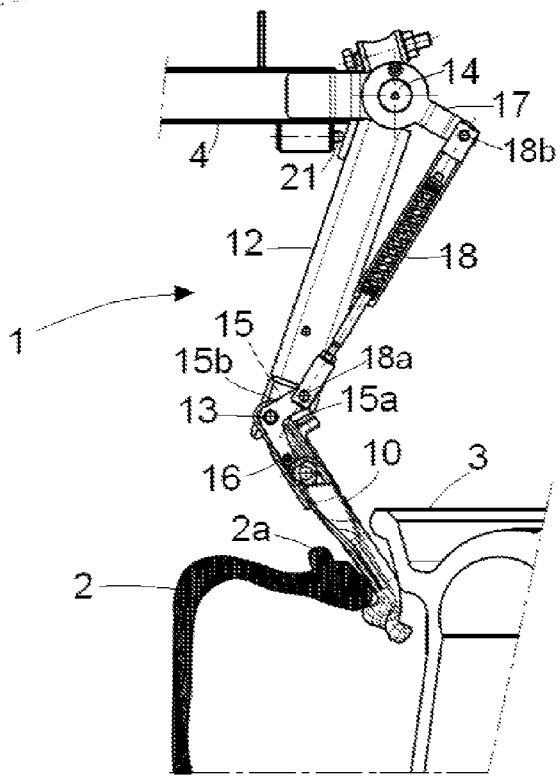
FIG. 3 illustrates the device of FIG. 1 inserted in the tire and ready to start the extraction of the tire bead.
Figure 4:
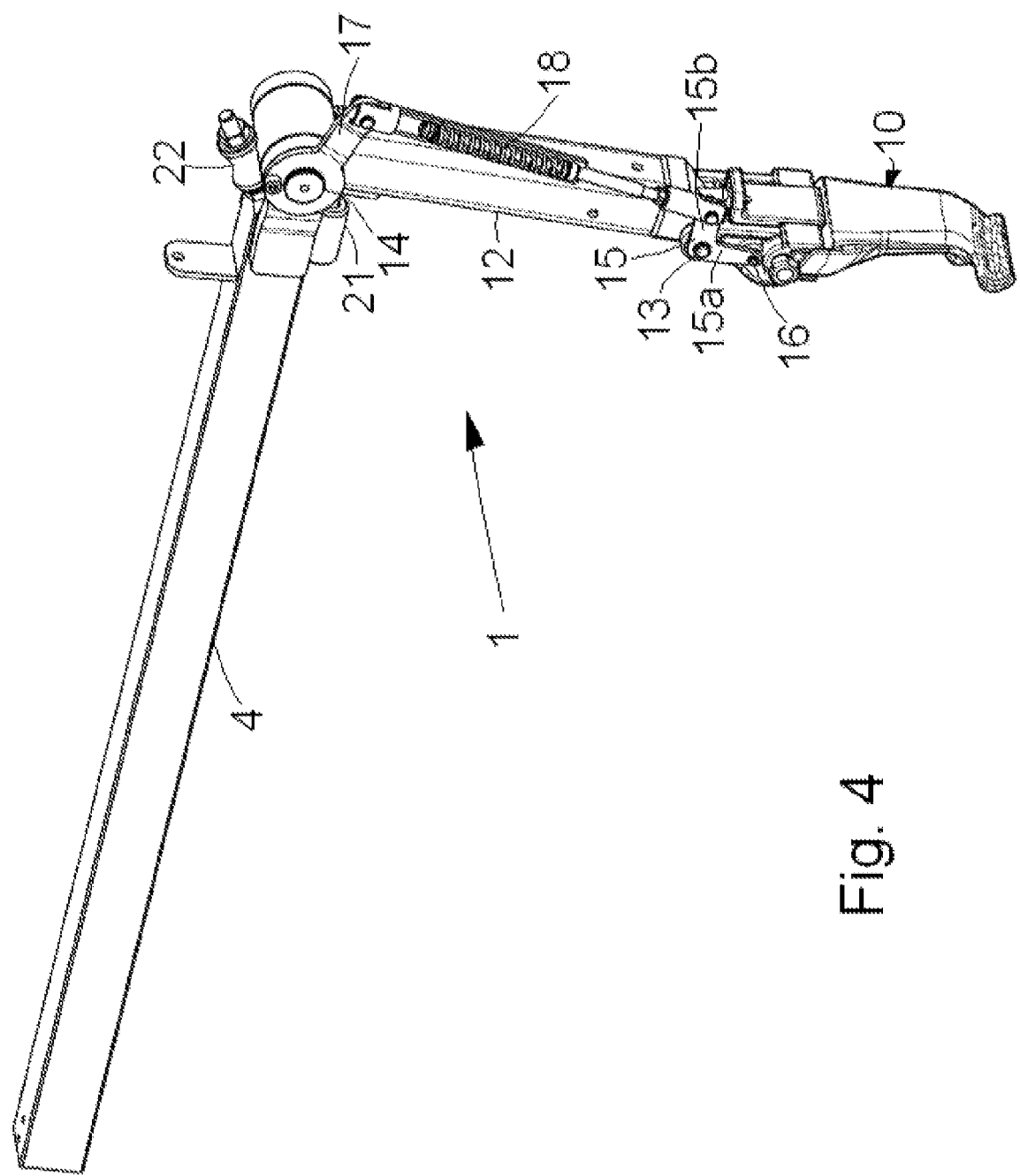
FIG. 4 shows a slightly top perspective view of the device of FIG. 1.

First, with reference to FIGS. 1 to 5, it will be observed that an automatic demounting device generically indicated with 1 according to the present invention for demounting a tire 2 from a rim 3 is constituted by a support arm 4, preferably of extendable-shortenable type, e.g. telescopic, in use being substantially extended horizontally and supported on a tire mounting-demounting machine 5, preferably equipped with programmed electronic control unit and equipped with rotatable rim-carrier means of any suitable type, such as a rotatable support table 6 equipped with jaws (not shown in the drawings) or a group of expandable arms, as is normal in the state of the art, for engaging the rim 3 of a tired wheel and driving it in controlled rotation around a rotation axis x-x, in use substantially transversely extending, for example vertically, with respect to the support arm 4 in such case horizontally extending.

The support arm 4 is in turn liftably and lowerably mounted (in any suitable manner as is known at the state of the art) on the tire mounting-demounting machine along a direction substantially parallel to the rotation axis x-x of the rim 3. The support arm 4 extends starting from an upright 8. Typically, this is fixed to a slide 7 slidably mounted along the substantially vertical upright 8 at the usual column, generically indicate with 9, of the tire mounting-demounting machine.

Figure 5:
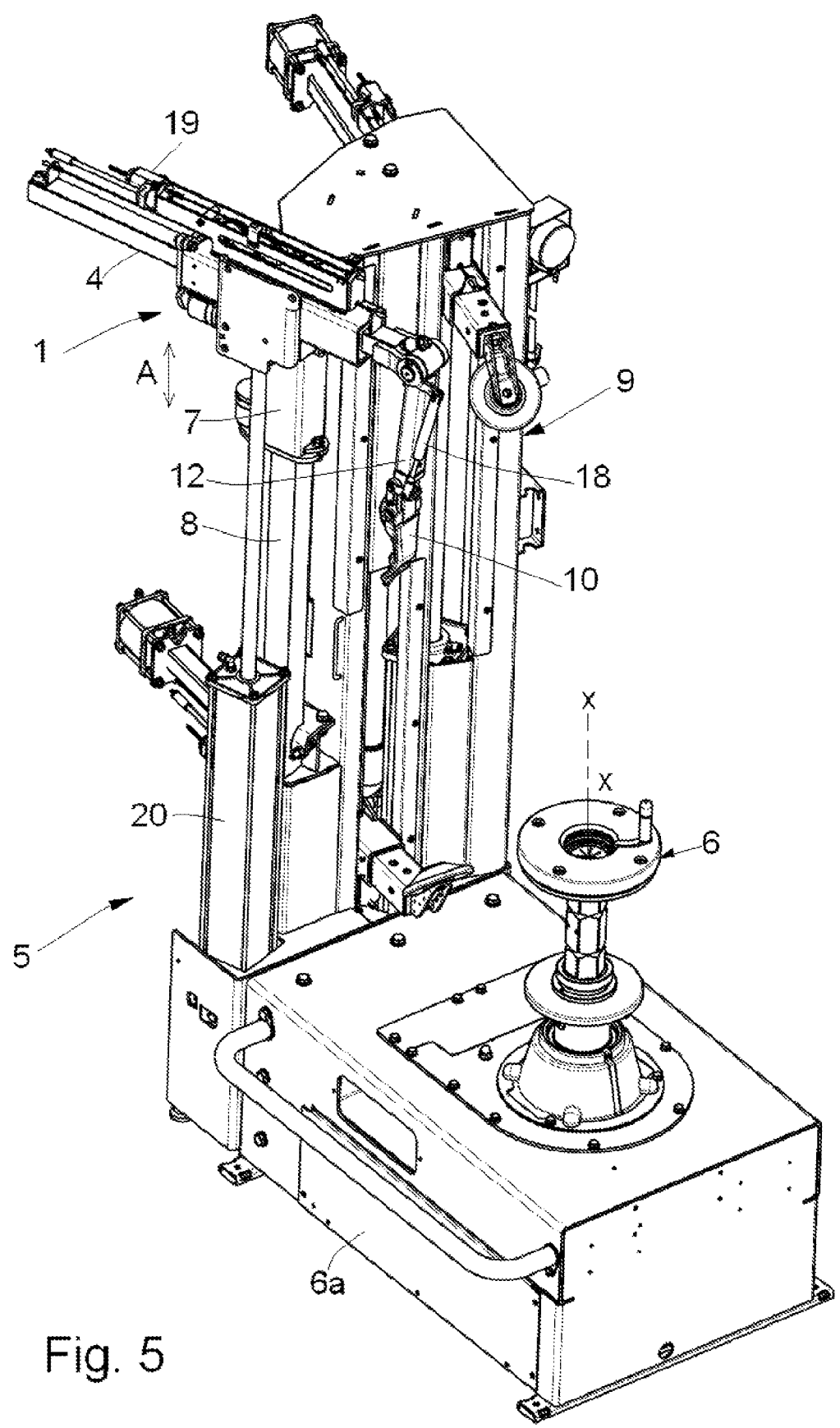
FIG. 5 shows the device of FIG. 1 mounted on a tire mounting-demounting machine.

The demounting device 1 then comprises a demounting tool 10, e.g. that taught in the patent IT-1 381 936, which is articulated to the support arm 4 and is designed to be positioned, in use, on top of the rotatable rim-carrier means, i.e. the rotatable table 6 with reference to the embodiment illustrated in FIG. 5, extending upward from a base 6a. The articulation of the demounting tool 10 to the support arm 4 occurs by means of an attachment member 12, typically a rectilinear metal tubular section, which has one end thereof articulated to the demounting tool 10 at a first articulation pin 13 and the other end thereof pivoted to the support arm 4 around a second articulation pin 14 extending substantially parallel to the articulation pin 13.

The articulation around the pin 13 between the demounting tool 10 and the attachment member 12 is preferably controlled by control means including a lever system, such as a spring shackle (not shown in the drawings) articulated at an intermediate point to the demounting tool 10, and around a first articulation axis 18a to a tie rod member 18, as is further explained hereinbelow. Preferably, the lever system is constituted by one elbow-shaped lever or a pair of twin elbow-shaped levers 15 pivoted on the first articulation pin 13 and with one end thereof articulated or fixed at 16 to the demounting tool 10 and the other end thereof articulated around the first articulation axis 18a to the tie rod member 18. Still more preferably, the lever system is articulated distant from the free work end of the tool and close to the articulation end of the tool to the attachment member 12.

The support arm 4 has its own section or appendage or pair of twin extension appendages 17, such section or appendage being extended in a projecting manner beyond (i.e. starting from) the second articulation pin 14. Advantageously, the appendage 17 is extended at an angle, e.g. between 30° and 60°, typically about 30°, with respect to the support arm 4 and can be anchored and suitably fixed to the pin 14 or directly to the support arm 4. Preferably, the end of the appendage 17 distant from the support arm 4 is at a lower level with respect to such support arm 4.

As already mentioned above, a tie rod member 18 is provided for, articulated on one side around the first articulation axis 18a to the other end of the elbow-shaped lever 15, and on the other side around a second articulation axis 18b to said extension appendage or section 17; in use, such section 17 has the function of forcing the articulation around the pin 13 between the demounting tool 10 and the attachment member 12 (as will be further explained below). The tie rod member 18 can be typically constituted by a rod or by a sufficiently rigid gas spring, suitably pre-loaded, so that it can be elongated if, during a demounting operation, the terminal work part or tip of the tool 10 is subjected to an energetic radial thrust with respect to the rim 3, especially in the direction moving away from the rotation axis x-x, thus preventing the device from being damaged.

More particularly, the elbow-shaped lever/levers 15 has/have a first segment 15a arranged substantially aligned with the tool 10 and a second segment 15b that is tilted, e.g. about 90° with respect to the first segment 15a. Preferably, the tie rod 18 is articulated around the articulation axis 18a to the free end of the second segment 15b of the elbow-shaped lever 15, the elbow-shaped lever resulting pivoted to the pin 13 and thus to the attachment member 12 at the section of connection of the first segment 15a to the second segment 15b, while the end of the first segment 15a distal from the pin 13 results articulated at 16 (e.g. fixed) to the tool 10.

Due to the attachment member 12, to the tie rod member 18 and to the pins 13 and 14, the demounting tool 10 results hung from the support arm 4 above the rotatable rim-carrier means 6 for the vertical tire mounting-demounting machines, or it substantially horizontally extends in front of the rotatable rim-carrier means in the horizontal tire mounting-demounting machines.

Alternatively, the tie rod 18 could be directly pivoted to the tool 10 or to a bracket fixed thereto; in this case, no lever system is provided for interposed between tie rod 18 and tool 10.

Advantageously, the articulation axis 18a between the tie rod member 18 and the tool 10 or at the bracket or lever system is spaced from the articulation pin 13, such that an articulated quadrilateral is delimited between the articulation pins 13 and 14 and the articulation axes 18a, 18b.

The support arm 4 is advantageously telescopic (FIG. 5), extendable-shortenable via actuation of a suitable double-acting jack 19 and liftable-lowerable via actuation of a double-acting jack 20 set to move the slide 7 on command along the upright 8.

Advantageously, in proximity to the pin 14, e.g. below the support arm 4, an elastic loading is provided for the attachment member 12, e.g. constituted by a tappet element 21 loaded with a thrust spring (not visible in the drawing), which serves to prevent backwards oscillations of the attachment member 12 and thus of the tool 10 in rest or non-use position.

A stop element 22 can also be provided for, mounted on the arm 4 and designed to adjust the rest position (i.e. the position of the tool attachment member before the tool comes into contact with the tire) of the attachment member 12 in accordance with the type of wheel to be demounted.

The tie rod member 18 can be elastically yieldable in a longitudinal direction, in order to allow, at the termination of the demounting operations, the passage of an apparatus between the tip of the tool 10 and the external edge of the rim. Nevertheless, it will be understood that during the demounting operations, the tie rod member must remain substantially rigid.

Figure 6:
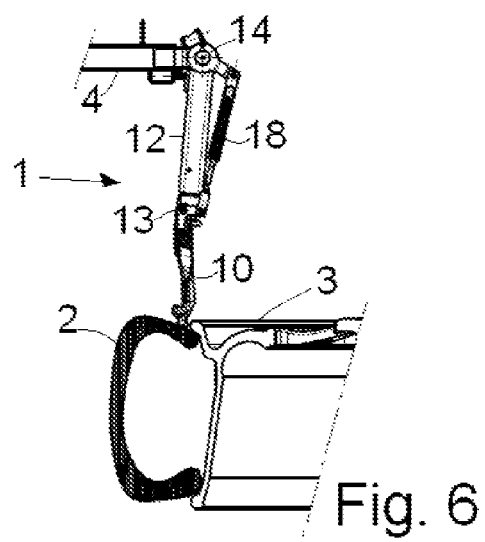
FIGS. 6 to 10 illustrate the sequence of the steps for demounting a tire without bead-saver edge by means of use of the automatic demounting device according to the present invention.
Figure 9:
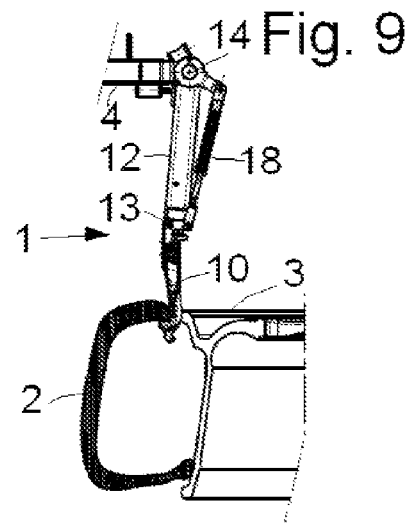
Figure 7:
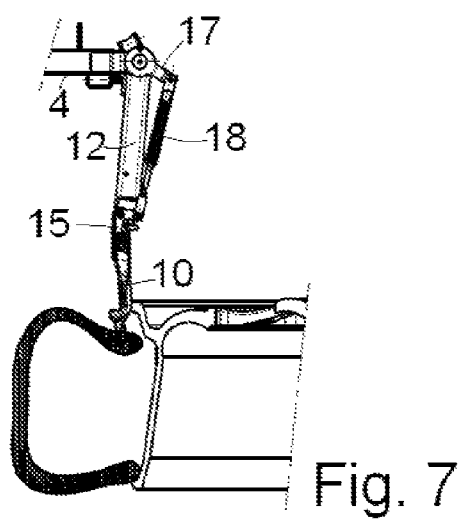
Figure 10:
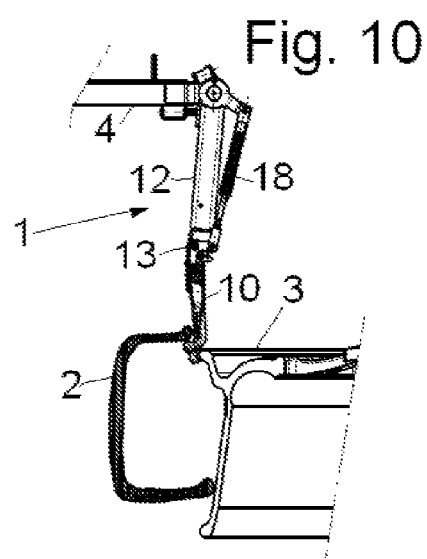
Figure 8:
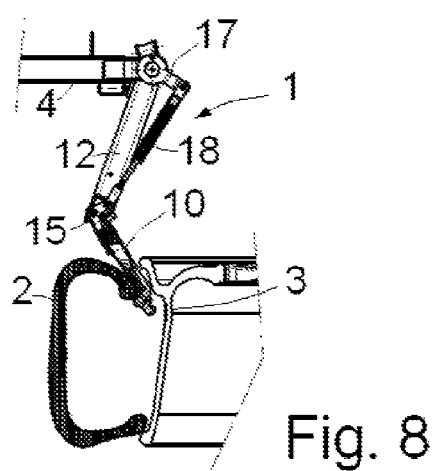
Figure 11:
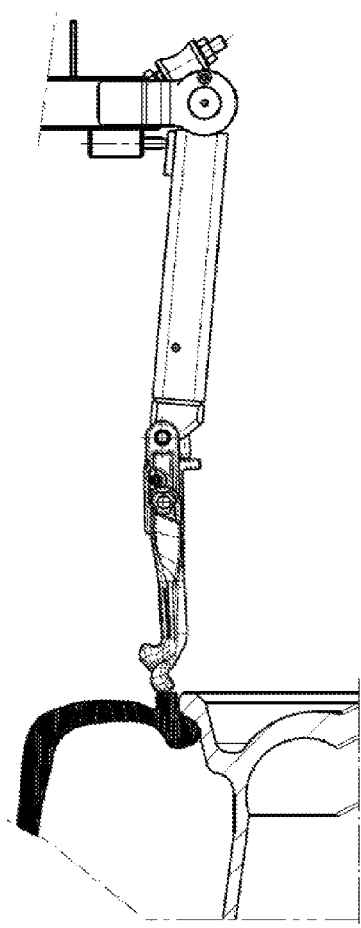
FIGS. 11 to 13 show an operative sequence of a failed demounting, with the use of a demounting device according to the state of the art.

The demounting device 1 operates very simply and reliably. Once the demounting tool 10 has been brought with its lower end on top of the bead—equipped or not equipped with bead-saver edge 2a (FIG. 1 or FIG. 6) next to the edge of the rim 3—the progressive lowering of the support arm 4 and thus of the demounting tool 10 towards the rim 3 is automatically controlled by the operator or programmed electronic control unit of the machine 5.

Figure 12:
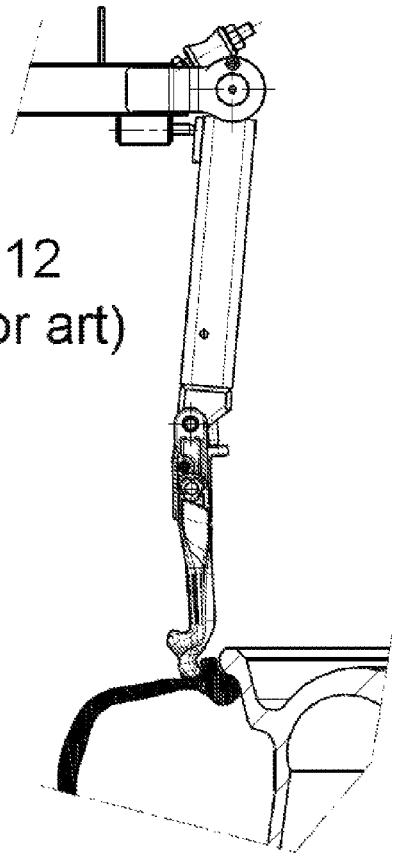
Figure 13:
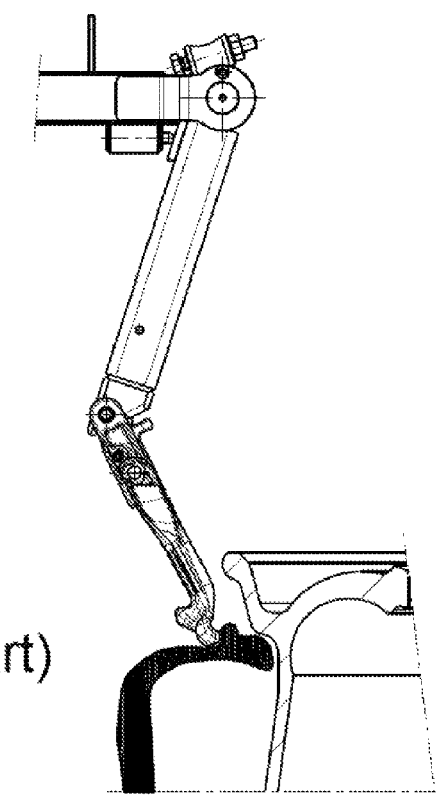

The lower end of the tire demounting tool 10 is first abutted against the side of the tire, and if provided for against the bead-saver edge 2a. As the lowering of the support arm 4 continues, the demounting tool 10 is imparted with a thrust force as a reaction to the pressure exerted on the tire bead. If the tip of the demounting tool 10 is positioned in a slightly receded position, i.e. in a zone of the bead-saver edge 2a relatively far from the edge of the rim 3, the tip of the tool would very likely slide backward, in the direction moving away from the rim, and would move beyond the bead-saver edge 2a (FIG. 12) and thus be definitively prevented from penetrating between the bead and the rim (FIG. 13).

The presence of the tie rod member 18 forces the demounting tool 10, via reaction, to rotate around the pin 13 such that it is tilted with its own tip aimed against the zone between the tire bead and the edge of the rim 3; at the same time, the tie rod member 18 also tilts the attachment member 12 rotating around the pin 14, so as to allow the device 1 to be shortened, such that the support arm 4 can continue its movement towards the rim 3. Indeed, the tie rod member 18, by maintaining the distance between the elbow-shaped lever 15 and the extension appendage or section 17 substantially fixed, prevents the demounting tool 10 from oscillating backwards without extending, moving to the side of the bead-saver edge 2a far from the rim 3, but rather it forces it to rotate with respect to the pin 13 in the manner explained above and illustrated in FIGS. 2 and 3.

It is important that the section or appendage 17 is extended beyond the pin 14 so as to constitute the distal end of the support arm 4. This since, if the tie rod member 18 is pivoted between the elbow-shaped lever or bell crank 15 and a pin situated at an intermediate point of the support arm 4, it would exert an initial drawing action for the device 1 to maintain the demounting tool 10 in substantial alignment with the attachment member 12; in other words, there would be backward oscillation, even if the tie rod member is constituted by a gas spring.

It will be understood that with a device according to the present invention, the operator or the control unit during the demounting steps must only command the moving of the tool along the direction parallel to the axis of the rim or wheel, the tilt of the tool being determined by the contact with the tire and/or rim and not by the operation or from maneuvers of the operator or control unit.

FIGS. 6 to 10 illustrate the subsequent steps of the demounting of a tire without bead-saver edge by means of a demounting device 1 according to the present invention, as a confirmation that it has multipurpose use with any tire type 2.

Such device is particularly useful with relatively soft tires.

The demounting device and the machine described above are susceptible to numerous modifications and variants within the protective scope defined by the following claims.

Hence, for example, in place of an extendable-shortenable arm, an arm could be provided for which is mounted in a manner such that it can be angularly moved with respect to the column of the machine, so that it can be adapted to the demounting of wheels of any size.

The invention claimed is:

1. A device for the automatic demounting of a tire from a rim having:
    a support arm designed to be mounted on a tire mounting-demounting machine equipped with rotatable rim-carrier means for engaging a rim or a tired wheel and driving it in controlled rotation around a rotation axis, said support arm being liftable and lowerable in a direction substantially parallel to said rotation axis,
    a demounting tool articulated to the support arm and designed to be positioned, in use, on top of or in front of said rotatable rim-carrier means,
    an attachment member for the demounting tool, which has one end thereof articulated to the demounting tool by means of a first articulation pin and the other end thereof pivoted to the support arm around a second articulation pin extending substantially parallel to said first articulation pin,
    comprising
    at least one extension appendage of said support arm or a section of said support arm, which extends beyond said second articulation pin, and
    at least one tie rod member that is articulated on one side to said tool, and on the other side to said extension appendage or section of said support arm.

2. A device according to claim 1, comprising means for controlling the articulation between said demounting tool and said attachment member including an articulation lever system between said tool and said tie rod member.

3. A device according to claim 2, wherein said lever system comprises one elbow-shaped lever or a pair of elbow-shaped levers pivoted on said first articulation pin and having one end articulated to said demounting tool and the other end articulated to said at least one tie rod member.

4. A device according to claim 1, wherein said at least one extension section or appendage projectingly extends starting from said second articulation pin.

5. A device according to claim 1, wherein said at least one extension section or appendage extends at an angle with respect to said support arm.

6. A device according to claim 1, wherein said at least one extension section or appendage is anchored to said second pin or anchored directly to the support arm.

7. A device according to claim 1, comprising a tappet element loaded with an elastic means for thrusting said attachment member.

8. A device according to claim 1, wherein said support arm comprises an extendable-shortenable arm.

9. A device according to claim 1, wherein said attachment member comprises a rectilinear metal tubular section.

10. A device according to claim 1, wherein said tie rod member is elastically yieldable in a longitudinal direction.

11. A device according to claim 1, comprising an upright, starting from which said support arm extends.

12. A device according to claim 1, wherein said tie rod member is articulated to said tool around a first articulation axis which is spaced from said first articulation pin, such that a quadrilateral is delimited between said first articulation pin, said second articulation pin, and the articulation axes of said tie rod member.

13. A tire mounting-demounting machine, comprising a device according to claim 1.

* * * * *